May 11, 1937.  E. S. CLARK  2,079,731
JOINT SEALING DEVICE
Filed June 19, 1933  2 Sheets-Sheet 1
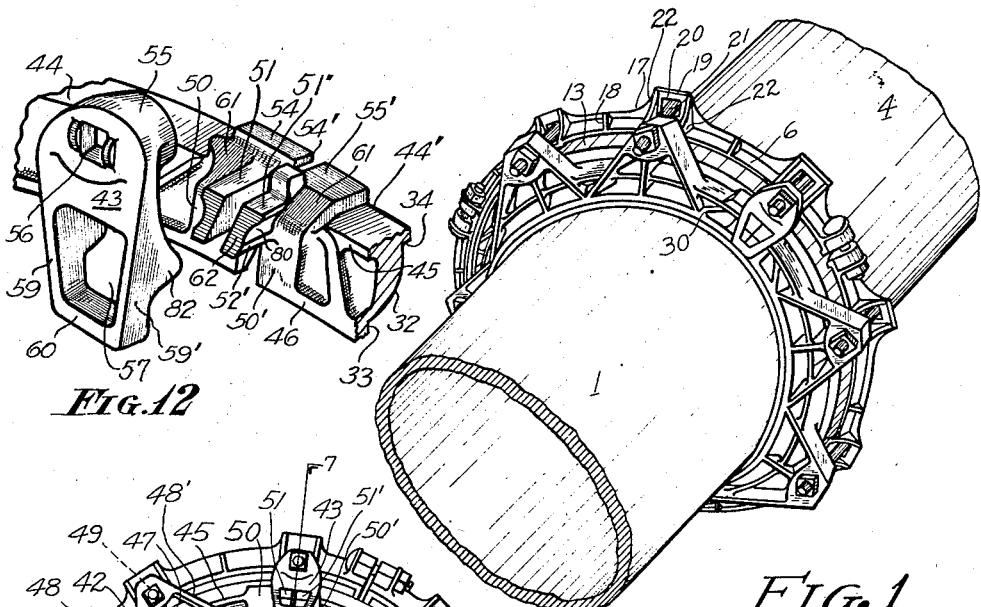
FIG. 12
FIG. 1
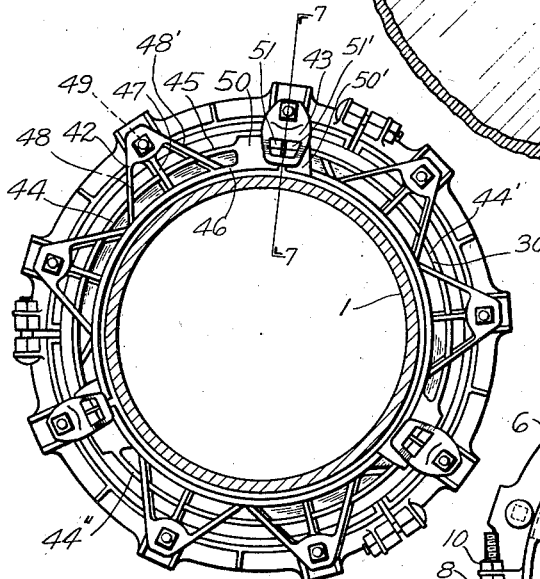
FIG. 2
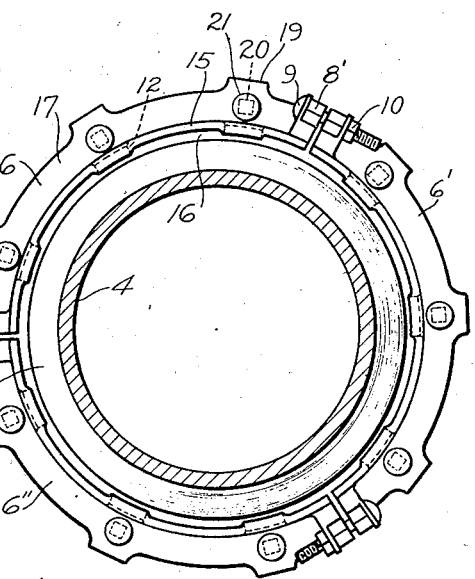
FIG. 3
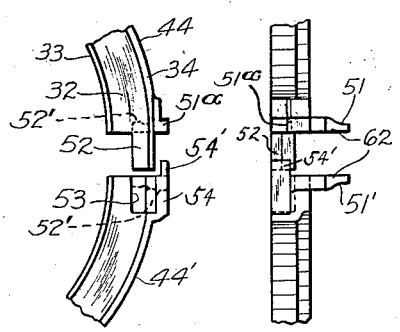
FIG. 4
Inventor
ELDON S. CLARK
Strauch & Hoffman
Attorneys May 11, 1937.　　　　E. S. CLARK　　　　2,079,731
JOINT SEALING DEVICE
Filed June 19, 1933　　　　2 Sheets-Sheet 2
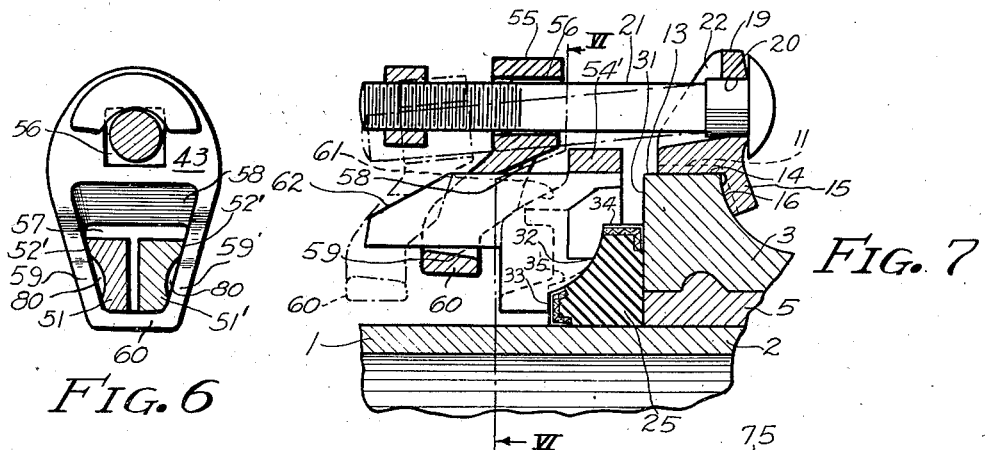
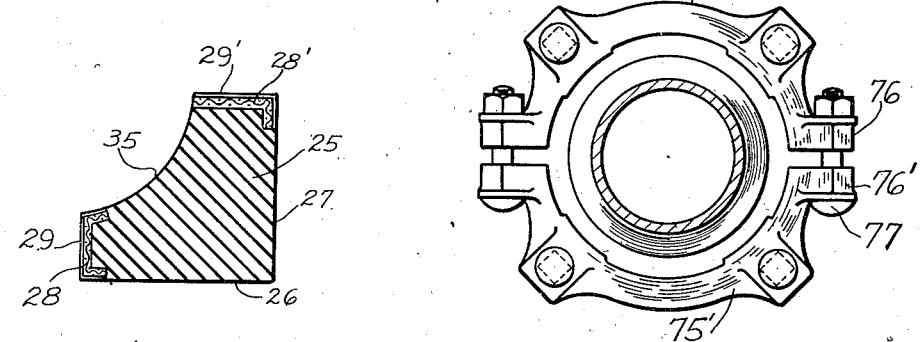
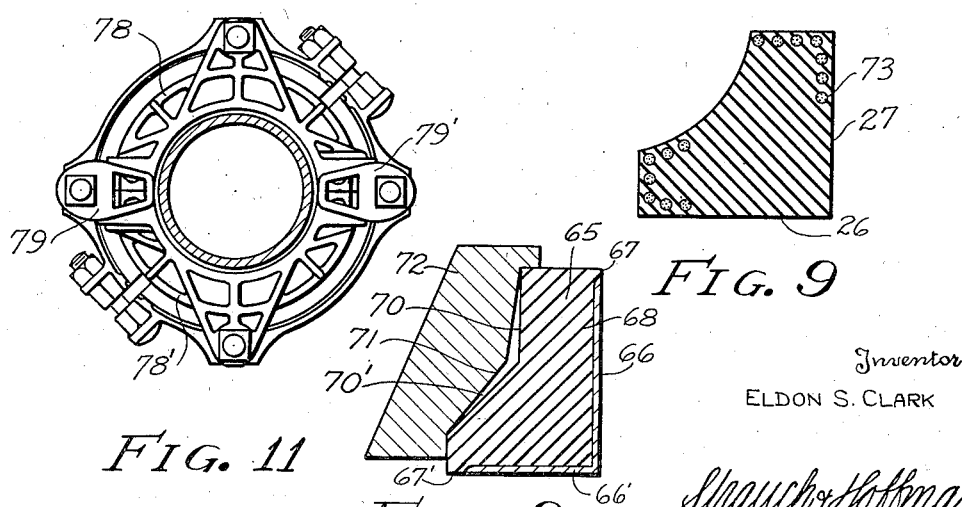
Inventor
ELDON S. CLARK
Strauch & Hoffman
Attorneys Patented May 11, 1937

2,079,731

UNITED STATES PATENT OFFICE 2,079,731

JOINT SEALING DEVICE

Eldon S. Clark, Detroit, Mich., assignor, by mesne assignments, to The Timken-Detroit Axle Company, a corporation of Ohio Application June 19, 1933, Serial No. 676,588

21 Claims. (Cl. 285—119)

This invention relates to joint sealing devices or leak clamps for pipe lines.

More particularly the invention is directed to a device for preventing the leakage of fluids through defective or leaky bell and spigot joints or like pipe joints without requiring the disassembly of the joint, and which, therefore, can be applied in the field. This application is a continuation in part of my application filed February 4, 1932, Serial Number 590,935 for sealing devices.

One object of the invention is to provide a leak preventing device for application to pipe joints in which provision is made for roughness of the pipe surfaces or for ordinary dimensional variation of pipe from specified normal pipe size.

Another object is the provision of a leak preventing device which compresses the deformable sealing member substantially uniformly about its circumference and forces the gasket into sealing engagement with the pipe joint.

Another object is the provision of a joint sealing device having a follower member which compresses a gasket, there being an integral reenforcement on or in the gasket at parts of the gasket subject to tension to relieve the tension on the gasket at such parts.

Other objects of the invention will appear hereinafter as the description thereof proceeds in connection with the accompanying drawings, and are defined by the appended claims.

As shown in the drawings

Figure 1 is a perspective of two sections of pipe having one form of my improved leak clamp applied thereto.

Figure 2 is an enlarged elevation of the follower ring and anchor ring in operative position on the pipe.

Figure 3 is an enlarged elevation of the anchor ring attached to a pipe.

Figure 4 is a detail view of the pressure ring at a joint.

Figure 5 is an enlarged cross section view of a preferred form of gasket.

Figure 6 is an enlarged view of a clamping dog taken on line VI—VI of Figure 7 showing the relation of the lugs on the follower ring in final position.

Figure 7 is an enlarged sectional view of the parts in initial and final assembled relation taken on line 7—7 in Figure 2 showing a modified type of clamping dog.

Figures 8 and 9 show section views of modified forms of gaskets.

Figure 10 shows a modified smaller size anchor ring assembled on a pipe bell.

Figure 11 shows a modified smaller size follower ring in assembled relation on a pipe to be used in conjunction with the anchor ring of Figure 10.

Figure 12 is an enlarged view showing the position of the follower ring segments assembled on a pipe before the clamping dog is applied.

With continued reference to the drawings, wherein like reference characters designate like parts throughout the several views thereof, a pipe section 1 is provided with a spigot 2 associated with bell 3 of an adjacent pipe section 4. The pipe sections are united in well known manner by lead caulking 5 or other suitable jointing material which has been poured or placed in the annular space between the spigot and bell.

Closely disposed about bell 3 of pipe 4 in the modification shown in Figures 1, 3, and 7 is a ring member which I term an anchor ring, and which comprises arcuate sections 6, 6' and 6" which are all alike so only one will be described in detail. There are integral lugs 8, 8' on each end of each section which are apertured to receive bolts 9, and nuts 10 threaded on the bolts draw the sections together for securely clamping them to the bell of the pipe. The anchor ring sections have a substantially cylindrical face 11 and intermediate integral lugs or pads 12 extended therefrom to engage and grip the cylindrical face 13 of the bell 3 while at the ends of the sections the lugs or pads 14 have a similar function. The pads 12 extend onto a radially and rearwardly extending skirt member 15 and are adapted to engage the rear shoulder 16 of the bell to prevent the anchor ring from being drawn forward over the bell.

It will be apparent from the construction so far described that the anchor ring is composed of a plurality of arcuate sections 6, 6' and 6" of such form as to form a true circle when the ends are spaced apart, and these sections may be clamped about the cylindrical face of a pipe bell by the bolts 9 passing through lugs 8, 8' in adjacent sections and drawn together by nuts 10. The anchor ring bears, by means of the pads 12 and 14, on the face 13 and rear shoulder 16 of the bell and is reenforced at the rear by a skirt portion 15. By reason of the pads 12 and 14 the area of contact of the anchor ring and bell is greatly reduced thereby enabling the anchor ring to conform to irregularities in the pipe surface. The anchor ring sections are made of malleable iron so that after they are bolted in place, if the pads 12 and 14 do not all contact with the pipe bell, because of irregularities in the pipe face or because of variations in standard pipe of the same size, the ring can be deformed by hammering thereon to correctly fit the bell. The provision of bolts 9 and lugs 8, 8' for securing the sections together also permits the ring to be used through a greater variation in sizes of pipe.

An upright flange 17 extends around the rear end of the anchor ring forming a continuation of the skirt 15, and is reenforced at intervals by the webs 18. However, these webs 18 may be omitted. The flange 17 is extended radially outward at intervals to provide lugs 19 having apertures 20 therein for reception of the bolts 21, and the lugs 19 are reenforced on each side of the apertures by the webs 22.

An annular gasket 25, (Figure 5) having a cylindrical internal face 26 and a substantially plane or radial face 27 is adapted to be disposed about the periphery of the pipe section 1 at its joint with the bell 3 of pipe 4. Preferably the gasket is made of rubber, and in the modification shown in Figure 5, has a relative non-elastic armor or binding designated by the numerals 28 and 28' embedded in the outer surface and longitudinal face respectively thereof. This armor or retaining member comprises a layer or layers of fibrous material as fabric, such as cotton duck, or similar material, which is vulcanized into the rubber. A thin coating or layer of rubber 29, 29' covers the reenforcement.

A pressure ring or follower 30 made up of a plurality of sections is adapted to be clamped in position about the spigot of the pipe and around the gasket 25 in such manner that it is forced toward the bell face of the pipe 3 and is clamped about the pipe spigot 2, and so that the gasket 25 is forced both towards the vertical face 31 of the bell and towards the spigot 2 of the pipe 1 to provide a seal for the joint. The internal face 32 of the follower ring is convex and has shoulders 33 and 34 at the ends of the convex face. The gasket 25 has a concave face 35 with which the convex face of the follower cooperates. As shown in Figures 1 and 2 some of the bolts 21 cooperate with the intermediate lugs 42 integral with the pressure or follower ring 30, and others retain in place the dogs 43 which hold the parts of the follower ring together at their ends.

The follower ring sections 44, 44' and 44'' are all alike, and only one will be described in detail. Each follower ring section 44, 44', etc., consists of a main ring portion having reenforcing ribs 45 and 46 respectively thereon, and having intermediate lugs 42 extending therefrom which also are of ribbed construction and consist of a central vertical rib 47 and inclined side ribs 48, 48' with a solid portion at their junction in which is formed a hole 49 for reception of the bolt 21. The follower ring sections have the thickened portions 50, 50' at their ends and the lugs 51, 51' are extended therefrom. At one end are the tongues 52 which form a continuation of the convex surface 32 and outer shoulder 34. The opposite end of the segment is recessed at 53 so that when adjacent segments are drawn together the tongues 52 rest in the recesses 53 and form a continuation of the curved surface 32, shoulder 34 and shoulder 33 at the joints. The outer shoulder 34 has a thickened portion 54 near the groove 53 which has an extension 54' thereon which, when the ends of the portions are brought together, laps over a corresponding thickened portion of shoulder 34 on the adjacent end of the adjacent follower ring section near tongue 52 and fits under an overhanging portion 51a (Figure 4) extending from lug 51 and overhanging the thickened portion 50'. This extension 54' and tongue 52, groove 52, 53, form an interlocked continuous joint when the ends of adjacent ring sections are brought together.

The dogs 43 (Figures 6, 7, and 12) have a thickened body portion 55 with a hole 56 therethrough for reception and guidance of a bolt. The opening 57 therein is tapered to conform closely in shape to the radially inclined or wedge faces 52' of lugs 51, 51'. This opening 57 is bounded by the radially inclined side members 59, 59' connecting bottom member 60' and top connecting portion having an inclined face 58, the latter being adapted to cooperate with the tapered end portions 62 of the lugs 51, 51'. The lugs 51, 51' are relieved on their tapered side as indicated at 80.

In assembling the leak clamp, the anchor ring sections 6, 6' and 6'' are put in place as shown in Figure 3 and are more or less loosely clamped in position on the pipe by the bolts 9 and nuts 10, the bolts 9 being sufficiently long for this purpose. The gasket then is cut to size and fitted in position about the bell joint, and the ends are held together in any convenient manner, as by staples. The follower ring sections 44, 44' and 44'' then are placed about the pipe, and ordinarily, the lugs 51, 51' will be separated as shown in Figure 12. The dogs 43 then are placed in position with side members 59 and 59' engaging the faces 52' of the lugs 51, 51' and with the inclined face 58 of the dogs engaging tapered end portions 62 of the lugs. The bolt 21 is inserted through the hole 20 in lug 19 and the hole 56 in the dog and by threading a nut on the end thereto, or by hammering, or both, the dog can be forced further onto the lugs 51, 51'. Bolts now can be inserted through the other lugs 20, and through the holes 49 in the intermediate lugs 42, and nuts threaded onto the ends thereto. After all the parts are thus assembled the nuts are tightened with a wrench.

The initial assembled position is shown in broken lines in Figure 7, the inclined face 58 engaging the tapered ends 62, the bottom member 60 being free of the lugs 51, 51'. In drawing tight the nuts holding the dogs 43 in place, the dogs are forced into the position shown in full lines in Figure 7. In assuming this position the inclined face 58 slides on surface 62 of the lugs 51, 51', thereby causing the dogs to move radially outward. The side members 59, 59' of the dogs engage the outer sides 52' of the lugs 51, 51' and thus as the dog is moved radially outward, the lugs 51, 51' are forced closer together, the dogs meanwhile being maintained substantially in a plane perpendicular to the axis of the pipe by the contact of the inclined face 58 and the surfaces 62 of the lugs 51, 51'. Upon further tightening of said nuts on bolts 21 and as the area of contact between the inclined surface 58 of the dog and surface 62 decreases, the extending cam portions 82 on the side members 59, 59', engage the inclined shoulders 61 on the follower ring sections further preventing tilting of the dogs. The combined effect of the inclined engaging faces in the action just described is to bring the lower web 60 from its disengaged position shown by dotted lines in Figure 7, to the position shown by full lines, approaching engagement with, or engaging, the bottom portions of lugs 51, 51', at the same time drawing together the ends of the follower ring and compressing the gasket against the joint to be sealed. Further, the movement of the dogs along the bolts brings the surfaces of cams 82 in greater contact with the surfaces of shoulders 61 of adjacent segments and renders rotation or rocking of the dogs impossible. The dogs are locked in clamped position due to the arrangement of sloping surfaces, against any tendency to release their clamping action.

The original contour of the gasket 25 is shown by the dotted line 35' in Figure 7, the full line showing the final shape of the gasket. The initial position of the pressure ring is such that shoulder 33 is out of contact with the face 29 of the gasket and skirt 34 laps over face 29' thereof. The gasket is compressed initially in a radial direction at a point on face 35 of the gasket near its junction with face 29 by the clamping action of the follower ring, and is further compressed radially by the action of the curved surfaces of the pressure ring at this point as the pressure ring is drawn toward the face of the bell. As the follower ring approaches the bell face, the outer portion of the curved face 35 adjacent the skirt 34, and the corresponding portion of the curved face of the pressure ring are brought into contact. As these portions of the meeting surfaces are substantially parallel to the bell face a resultant direct longitudinal compression of the gasket is created, and as the gasket expands under this force the outward expansion thereof is limited by contact with the skirt 34 whereby direct compression of the gasket against the bell face is maintained. Further axial movement of the pressure ring brings the curved surface 32 of the pressure ring further into contact with the curved face 35 of the gasket whereby the gasket is positively pressed toward the joint, while any tendency of the rubber to flow outwardly at the outer portions of the gasket is resisted and restricted by the form of the follower ring and the direct application of the compressive force. The fabric reenforcement additionally prevents the gasket from flowing and relieves the tension of the rubber. The rubber facing of the gasket flows into the irregularities of the pipe surface and protects the fabric from deteriorating substances, such as moisture, etc.

In the modified gasket shown in Figure 8, the gasket 65 has two joint engaging faces 66 and 66' made of relatively soft rubber which may extend for the full length of the joint engaging faces, but preferably, as shown extend close to the shoulders 67, 67'. The body 68 of the gasket is made of a relatively harder rubber and which is extended to cover the soft rubber at the shoulders as shown at 67, 67' to prevent undue extrusion thereof when pressure is applied to the gasket. One face of the gasket is shown as generally concave and consists of two or more portions 70, 70' adapted to be engaged by a similarly shaped convex gasket engaging face 71 of the follower 72 which compresses the gasket in the manner already described. If desired the modifications shown in Figures 5 and 9 may have similar shaped faces in which case a similar shaped follower ring is employed. Further, in the modification shown in Figure 9 the gasket 27 has imbedded therein adjacent the faces thereof the inelastic cords 73 which may be of linen, cotton or similar material and protect the gasket at these joints from undue extrusion.

In Figures 10 and 11 is shown a modified form of anchor member and follower member for use on smaller sized pipes. The anchor ring consists of two parts 75 and 75' similar to the anchor ring previously described and each section has two lugs 76, 76' for receiving suitable bolts 77. A follower ring consisting of two parts 78 and 78' and having one intermediate dog each 79, 79' is adapted to be clamped to the anchor ring. As the construction operation of this modification is similar to that previously described, the description thereof need not be repeated.

The invention may be embodied in other specific forms without departing from the spirit or essential characteristics thereof. The present embodiment is therefore to be construed in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a pipe joint sealing device, an anchor member, a gasket for engaging the pipe joint, and a follower for compressing said gasket, said follower comprising a plurality of arcuate sections having portions at the ends thereof with inclined faces, a clamping dog having means for initially engaging said faces, means for advancing said dogs to draw together the ends of said sections, and means for securing said sections intermediate their ends to said anchor member.

2. In a pipe joint sealing device, an anchor member, a gasket for engaging the pipe joint, and a follower for compressing said gasket, said follower comprising a plurality of arcuate sections having portions at the ends thereof with inclined faces, a clamping dog having means to engage said inclined faces to draw together the ends of said sections, means on said dog to maintain said dog upright during the drawing operation, and means to secure said follower to said anchor member.

3. In a pipe joint sealing device, an anchor member, a gasket for engaging the pipe joint, and a follower for compressing said gasket, said follower comprising a plurality of arcuate sections having portions at the ends thereof with inclined faces, a clamping dog having means to engage said inclined faces to draw together the ends of said sections, means on said dogs cooperating with said sections and said portions to prevent canting of the dog during the drawing operation, and means for securing said sections to the anchor member.

4. In a pipe joint sealing device, an anchor member, a gasket for engaging the pipe joint, and a follower for compressing said gasket, said follower comprising a plurality of arcuate sections having portions at the ends thereof with inclined faces and tapered portions, a clamping dog having means to engage said inclined faces to draw together the ends of said sections, projecting portions on said dog for initially engaging said inclined faces, and an inclined face on said dog for engaging said tapered portions whereby canting of the dog in initial position is prevented, and means for securing said sections to the anchor member.

5. In a pipe joint sealing device, an anchor member, a gasket for engaging the pipe joint, and a follower for compressing said gasket, said follower comprising a plurality of arcuate sections having projecting lugs at the ends thereof with radially inclined faces, a portion of said faces being relieved, a clamping dog having means for initially engaging said faces, and means for securing said dog to the anchor member whereby the ends of the follower member sections are drawn together.

6. In a pipe joint sealing device, an anchor member, a gasket for engaging the pipe joint, and a follower for compressing said gasket, said follower comprising a plurality of arcuate sections having projecting lugs at the ends thereof with radially inclined faces and tapered end portions, a portion of said radially inclined faces being relieved, a clamping dog having an aperture therethrough with similarly radially inclined side walls, cam portions on the dog for initially engaging said inclined faces, an inclined face on said dog for initially engaging said tapered end portions of said lugs, and means for adjustably securing said clamping dog to the anchor member.

7. In a pipe joint sealing device, an anchor member, a gasket for engaging the pipe joint, and a follower for compressing said gasket, said follower comprising a plurality of arcuate sections having projecting lugs at the ends thereof with radially inclined faces and tapered end portions, a clamping dog having an aperture therethrough with inclined side walls, an inclined face on said dog for engaging said tapered end portions, and means for securing said dog to the anchor member whereby the bottom wall of the aperture engages the bottom of said lugs.

8. In a pipe joint sealing device, a follower member comprising a plurality of adjustable members having a gasket engaging face, said members having adjacent edges mated to provide an interlocked substantially continuous joint in all positions of adjustment, and a reenforcing extension on one end of a member adjacent the outer periphery thereof adapted to be brought into overlapped relation with an adjacent member.

9. In a pipe joint sealing device, an annular sealing gasket having angular joint engaging faces of relatively soft rubber, and backed by a body portion of relatively hard flexible rubber, adapted to be engaged by a follower.

10. In a joint sealing device, a sealing gasket of relatively hard rubber having an angular joint engaging face, said face having a portion adjacent the angle thereof of relatively soft rubber, the relatively hard rubber portion of the gasket being extended to form a shoulder adjacent the joint engaging face for engagement by a gasket compressing member.

11. In a pipe joint sealing device, an annular sealing gasket having angular joint engaging faces of relatively soft rubber and backed by a body portion of relatively hard flexible rubber adapted to be engaged by a follower, the gasket being generally spandrel shape in cross section.

12. In a pipe joint seal, a follower ring comprising arcuate ribbed sections having peripherially extended apertured lugs thereon, mated cut out portions at the ends of said sections adapted to lie in over-lapped nested relation, and means including cams adjacent the ends of said sections for radially adjusting said sections about a pipe.

13. In a pipe joint sealing device, a gasket for engaging the pipe joint, a follower for compressing the gasket, said follower comprising a plurality of arcuate sections; lugs adjacent the ends of said sections; members cooperating with said lugs to force said ends into interlocking position and means associated with said lugs to maintain said members in a position at all times substantially perpendicular to the axis of the pipe.

14. In a pipe joint sealing device, an anchor member, a gasket for engaging the pipe joint and having a rear face defined by two surfaces intersecting at an obtuse angle, a follower for compressing the gasket with a gasket contacting face defined by two surfaces intersecting at a greater obtuse angle than said gasket surfaces, said follower comprising a plurality of arcuate sections, and means for adjustably clamping said follower to compress said gasket uniformly about its periphery, said gasket and said follower being so disposed and related through said obtuse angled surfaces that the edges of said gasket sustain greater initial compression than the central portion thereof.

15. In a pipe joint sealing device, an anchor member, a gasket for engaging the pipe joint and a follower for compressing said gasket, said follower comprising a plurality of arcuate sections having portions at the ends thereof with inclined faces and tapered end portions, a clamping dog having means to engage said inclined faces to draw together the ends of said sections and having means engaging said tapered portions to force said dog radially, and means to adjustably secure said follower to said anchor ring.

16. In a pipe joint sealing device, a gasket for engaging the pipe joint; a follower for compressing said gasket comprising a plurality of arcuate sections having portions at the ends thereof with inclined faces; a clamping dog with means for engaging said faces; and means for advancing said dog to draw the ends of said sections together.

17. In a pipe joint sealing device, a gasket for engaging the pipe joint; a follower for compressing said gasket, comprising a plurality of arcuate sections having portions at the ends thereof with inclined faces; a clamping dog having means to engage said inclined faces to draw together the ends of said sections and means on said dog to prevent canting thereof during the drawing operation.

18. In a pipe joint sealing device, a gasket for engaging the pipe joint; a follower for compressing said gasket comprising a plurality of arcuate sections having projecting lugs at the ends thereof with radially inclined faces; a clamping dog having means for engaging said faces, and means for forcing said dog substantially normal to a plane passing through the line of juncture of said pipe joint whereby the ends of the follower sections are drawn together.

19. In a sealing device for a bell and spigot joint, a gasket comprising portions of relatively soft material arranged to engage adjacent portions of the bell and spigot and a surface of relatively hard material removed from the bell and spigot connection and defined by at least two planes intersecting at an obtuse angle; a follower for compressing said gasket comprising a surface arranged to engage the last mentioned surface of said gasket and defined by at least two planes intersecting at an obtuse angle greater than the angle between said gasket planes whereby under pressure of said follower the edges of said gasket sustain greater initial compression than the central portion thereof.

20. In a pipe joint sealing device, an anchor member, a gasket for engaging the pipe joint, and a follower for compressing said gasket, said follower comprising a plurality of arcuate sections, each section having portions at the ends thereof with inclined faces, clamping dogs having means for engaging said faces, means for advancing said dogs to draw together the ends of said sections, radially extending lugs integral with said sections intermediate the ends thereof, and bolts passing therethrough for securing said sections intermediate their ends to said anchor member.

21. In a pipe joint sealing device, an anchor member, a gasket for engaging the pipe joint, and a follower for compressing said gasket, said follower comprising a plurality of arcuate sections, each section having portions at the ends thereof with radially inclined faces, radially extending clamping dogs having means for engaging said faces, means for advancing said dogs to draw together the ends of said sections, and means for securing said sections intermediate their ends to said anchor member.

ELDON S. CLARK.